US010028421B2

(12) United States Patent
Tesouro et al.

(10) Patent No.: US 10,028,421 B2
(45) Date of Patent: Jul. 24, 2018

(54) SCARIFIER FOR DEEP STRIP-TILLAGE

(71) Applicant: INSTITUTO NACIONAL DE TECNOLOGÍA AGROPECUARIA, Ciudad de Buenos Aires (AR)

(72) Inventors: Mario Omar Tesouro, Pcia de Buenos Aires (AR); Lidia Beatriz Donato, Pcia de Buenos Aires (AR); Juan Pablo D'Amico, Pcia de Buenos Aires (AR); Marcos Andrés Roba, Pcia de Buenos Aires (AR); Enrique Fernández De Ullivarri, Tucumán (AR); Angel Romito, Pcia de Buenos Aires (AR)

(73) Assignee: INSTITUTO NACIONAL DE TECNOLOGÍA AGROPECUARIA, Ciudad de Buenos Aires (AR)

( * ) Notice: Subject to any disclaimer, the term of this patent is extended or adjusted under 35 U.S.C. 154(b) by 45 days.

(21) Appl. No.: 14/539,529

(22) Filed: Nov. 12, 2014

(65) Prior Publication Data

US 2015/0129256 A1   May 14, 2015

(30) Foreign Application Priority Data

Nov. 13, 2013  (AR) .............................. 20130104169

(51) Int. Cl.
*A01B 13/08* (2006.01)
*A01C 23/02* (2006.01)
*A01B 13/14* (2006.01)

(52) U.S. Cl.
CPC ............ *A01B 13/08* (2013.01); *A01C 23/025* (2013.01); *A01B 13/14* (2013.01)

(58) Field of Classification Search
CPC ........ A01B 13/14; A01B 13/08; A01C 23/025
USPC ......................................... 172/140, 382, 196
See application file for complete search history.

(56) References Cited

U.S. PATENT DOCUMENTS

| 843,386 | A | * | 2/1907 | Benson | .................... | E02F 5/027 |
|---|---|---|---|---|---|---|
| | | | | | | 37/378 |
| 905,895 | A | * | 12/1908 | Luchini | ..................... | A01B 3/14 |
| | | | | | | 172/356 |
| 3,782,481 | A | * | 1/1974 | Quanbeck | .............. | A01B 35/22 |
| | | | | | | 172/265 |
| 4,321,971 | A | * | 3/1982 | Hake | .................... | A01B 61/046 |
| | | | | | | 172/710 |

(Continued)

FOREIGN PATENT DOCUMENTS

AR          003613 A1    8/1998
AR          035848 A1    7/2004

*Primary Examiner* — Thomas B Will
*Assistant Examiner* — Joel F. Mitchell
(74) *Attorney, Agent, or Firm* — Muncy, Geissler, Olds & Lowe, P.C.

(57) ABSTRACT

Scarifier for deep strip-tillage, that after a single trip allows the soil to be in adequate conditions for planting or sowing, operating with a great energy efficiency, contributing to an improvement in the production environment. The scarifier comprises a plurality of tillage units (a), spaced apart and located parallel to each other, and wherein each tillage unit (a) comprises a support structure (2) on which the corresponding tines (1a, 1b, 1c) are mounted, the lower ends of which are located at different heights, with the depth below the ground (d) being greater toward the rear of the scarifier. The scarifier preferably incorporates a fertilization system.

5 Claims, 2 Drawing Sheets

(56) References Cited

U.S. PATENT DOCUMENTS

| | | | | |
|---|---|---|---|---|
| 4,444,271 A | * | 4/1984 | Dietrich, Sr. | A01B 49/02 |
| | | | | 172/140 |
| 4,454,920 A | * | 6/1984 | Dietrich, Sr. | A01B 49/02 |
| | | | | 172/138 |
| 4,502,545 A | * | 3/1985 | Couser | A01B 73/067 |
| | | | | 172/311 |
| 4,538,689 A | * | 9/1985 | Dietrich, Sr. | A01B 49/02 |
| | | | | 172/700 |
| 4,924,946 A | * | 5/1990 | Dietrich, Sr. | A01B 15/025 |
| | | | | 172/1 |
| 5,161,622 A | * | 11/1992 | Godbersen | A01B 49/02 |
| | | | | 172/140 |
| 5,207,279 A | * | 5/1993 | Nelson | A01B 23/046 |
| | | | | 172/140 |
| 5,695,012 A | * | 12/1997 | Kesting | A01B 13/08 |
| | | | | 172/166 |
| 6,216,616 B1 | | 4/2001 | Bourgault | |
| 2006/0021769 A1 | | 2/2006 | Ankenman et al. | |
| 2012/0205130 A1 | | 8/2012 | Rozendaal et al. | |

* cited by examiner

SCARIFIER FOR DEEP STRIP-TILLAGE

TECHNICAL FIELD

The present invention relates to a scarifier for deep strip-tillage, that allows the soil to be in adequate conditions for planting or sowing after a single trip, and that operates with great energy efficiency, leading to an improved production environment.

BACKGROUND OF THE INVENTION

It is known that labors done to systematize the fields with multiannual crops require large energy inputs and therefore large amounts of fuel consumption. Particularly, cultivation of sugar cane comprises the most energy demanding labors, particularly the tasks of implantation and subsoiling the interline (path), resulting in higher energy consumption than those observed in equivalent labors in the Pampean region.

Soils with a history of sugarcane monoculture are often characterized as soils with low structure and high bulk density, resulting from a combination of soil working during the growing season and compaction caused by heavy and intensive traffic at the time of harvest.

It is therefore an object of the present invention the optimization of soil work, from the prior tillage to the end of the period of cropping, and the prevention of soil compaction processes caused by machinery.

The present invention provides a scarifier for deep strip-tillage which also applies fertilizers for the production of industrial cultures.

The scarifier for strip-tillage of the present invention clearly differs from inventions of the prior art, such as disclosed in U.S. Pat. No. 6,216,616 (Borgault) in that the incorporation of fertilizer is not done by means of coulter or disc furrow openers, and although there are active organs for soil cutting, technically they do not cause disruption of the soil. Moreover, disc furrow openers are not able to go deeper than 10 cm, and consequently the product application is relatively superficial.

Regarding the invention published in U.S. Pat. No. 7,017,675 B2 (Ankenman et al.) the main differences lie in the great diversity or active organs required according to said patent to achieve a comprehensive tillage in one trip. Moreover, it is clear that said machine is not intended for strip-tillage since it acts mechanically on the whole ground area covered by each trip and it does it in shallow depths, typical of those used in the implantation of annual grain crops.

Regarding U.S. Pat. No. 8,307,908 B2 (Rozendal et al.), the differences lie in the fact that active organs are coulters or discs not producing soil tillage and working at very limited depths. Another feature that makes a difference is that, like the above inventions disclosed in patents, it is not related to machines for strip-tillage.

Regarding patent application AR 003613 A1 (Di Prinzio et al.) the main difference lies in the fact that it consists of only three tillage tines arranged in such a way that the two side tines are paired and ahead of the third one. This difference is also evident in the patent application AR 035848 A1 (Di Prinzio et al.) which also has a helical active organ powered by the rear power take off (PTO) intended to mix and invert the soil horizons.

SUMMARY OF THE INVENTION

It is an object of the present invention a scarifier for deep strip-tillage which comprises a plurality of tillage units a, spaced apart and located parallel to each other, where each tillage unit a comprises a support structure 2 over which corresponding tines 1a, 1b, 1c are mounted, the lower ends of which are located at different heights, reaching deeper below the ground d toward the rear of the scarifier.

In a preferred embodiment of the present invention, each tillage unit a comprises four tines, the front tine 1a and the rear tine 1c being located in a centered position and intermediate tines 1b, being located at each side of the unit a.

In a more preferred embodiment, the two intermediate tines 1b are located at a same level relative to the ground.

In another preferred embodiment of the present invention, the scarifier comprises three tillage units a which are equally spaced apart on the width of the scarifier.

In a yet preferred embodiment of the present invention, the tillage units a are located on a general support structure, and are capable of moving transversally in order to modify the distance between them.

In a more preferred embodiment of the present invention, each tillage unit a incorporates front cutting organs of the coulter or disk type 3.

In a most preferred embodiment of the present invention, the tines 1a, 1b, 1c can move transversally over said support structure.

In the preferred embodiment of the scarifier for strip-tillage of the present invention, four tillage organs or tines make up each unit and the arrangement is such that only one of these is located ahead of the rest. Moreover, the fact that each tillage unit of the scarifier for strip-tillage comprises four tillage organs makes it possible tilling in three depth ranges, unlike the mentioned subsoilers of the prior art which can only do it in two depth ranges. This constructive feature allows for a lower power requirement given the more gradual deepening of the elements. It also allows a greater working depth without causing adverse effects in the soil as a result of what is technically known as the critical depth.

In the scarifier for strip-tillage, the tines arranged on the sides of the central action line are not paired or mated as in designs of other mentioned subsoilers, conferring a greater ability to work in soils with abundant living or dead vegetation cover without getting stuck.

Furthermore, the arrangement of the front cutting organs of coulter or disk type also gives the scarifier for strip-tillage of the invention enhanced working capacity in areas with large volume of crop residues on the ground surface.

The lower energy consumption is mainly given by the spatial arrangement of the tines and by the fact that it is a strip-tillage system acting only on the portion of soil that must be disrupt.

The scarifier of the present invention comprises a plurality of tillage units acting on a strip of ground, remaining between two of such tillage units an area which is not tilled. Each of these tillage units comprises at least two vertical tillage organs or tines arranged in a manner so as to perform deep strip-tillage in a single trip while fertilizer is incorporated.

In the preferred embodiment, the tillage unit comprises four tillage organs or tines arranged so that they act at increasing depths towards the rear of the unit. These tillage organs or tines are preceded by superficial coulters for cutting surface residues, coulters which are not involved in the disruption of the soil and that are located ahead of the tines.

The scarifier performs the tillage at great depth in one trip and with lower energy demand, thanks to the tines or tillage organs acting on strips and successively at different depths.

Additionally and preferably, incorporated to each tillage organ or tine there is a fertilizing system that simultaneously applies the product at different depths enabling application of large doses without the usual drawbacks of this approach.

BRIEF DESCRIPTIONS OF THE DRAWINGS

In order to make the object of the present invention more understandable, it has been illustrated with diagrammatic figures, in one of the preferred embodiments. The drawings are intended to illustrate the invention and they do not limit the invention in any way.

In all figures, same numbers and letters refer to the same elements of the invention.

DETAILED DESCRIPTION OF THE INVENTION

Figure 1:
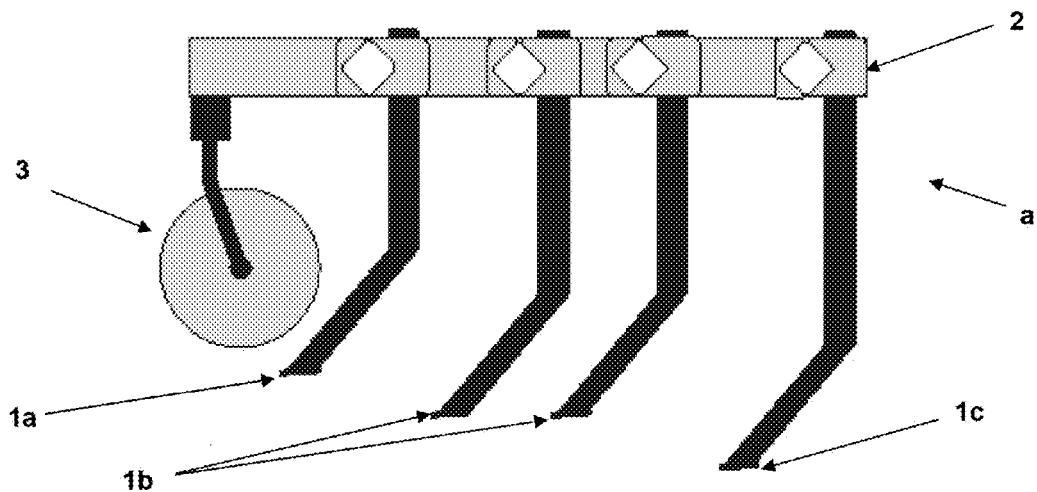
FIG. 1 is a side view of one of the tillage units used by the soil scarifier object of the present invention.
Figure 2:
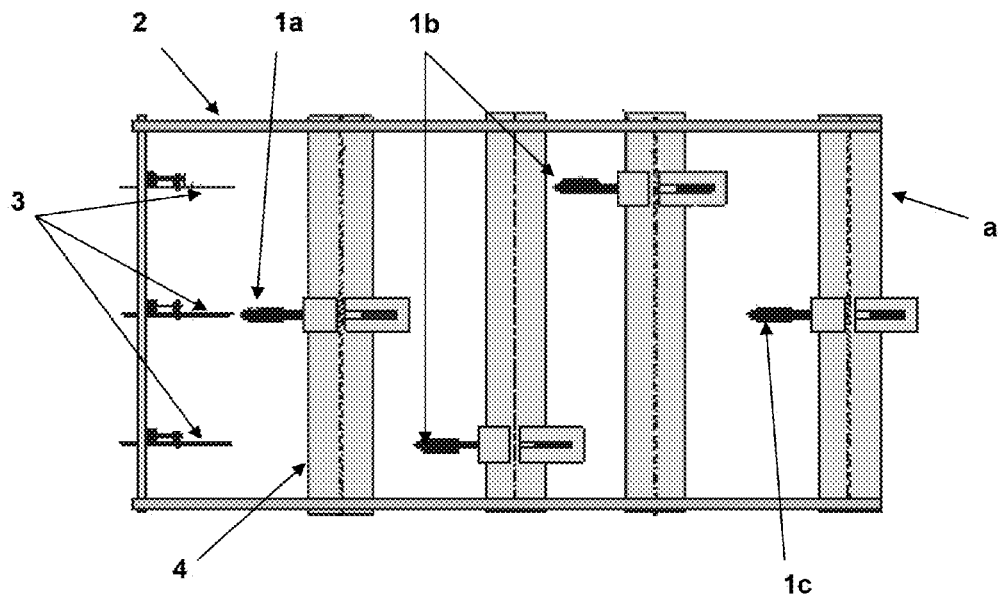
FIG. 2 is a top or plan view of the tillage unit of FIG. 1.

FIGS. 1 and 2 show a preferred and nonexclusive embodiment of the present invention, where the scarifier for deep strip-tillage comprises a plurality of tillage units a, spaced apart and parallel to each other, and wherein each tillage unit a comprises a support structure 2 on which respective tines 1a, 1b, 1c are mounted, the lower ends of which are located at different heights, with the depth below the ground d being greater toward the rear of the scarifier. Preferably, the scarifier incorporates three front cutting organs of the coulter or disk type 3, positioned in line with the tillage organs or tines 1a, 1b, 1c.

FIGS. 1 and 2 also show that each tillage unit a, has four tines 1a, 1b, and 1c, the front tine 1a and the rear tine 1c being located in a centered position and intermediate tines 1b, being located at each side of the unit; said two intermediate tines 1b being located at a same level relative to the ground d. FIG. 2 also shows that the front tine 1a and the rear tine 1c are located in alignment, and the intermediate tines 1b are located at a same lateral distance with respect to said front and rear tines 1a and 1c.

In a preferred embodiment the tines 1a, 1b, and 1c, can move transversally over said supporting structure, since they are mounted on a crossbar 4.

Figure 3:
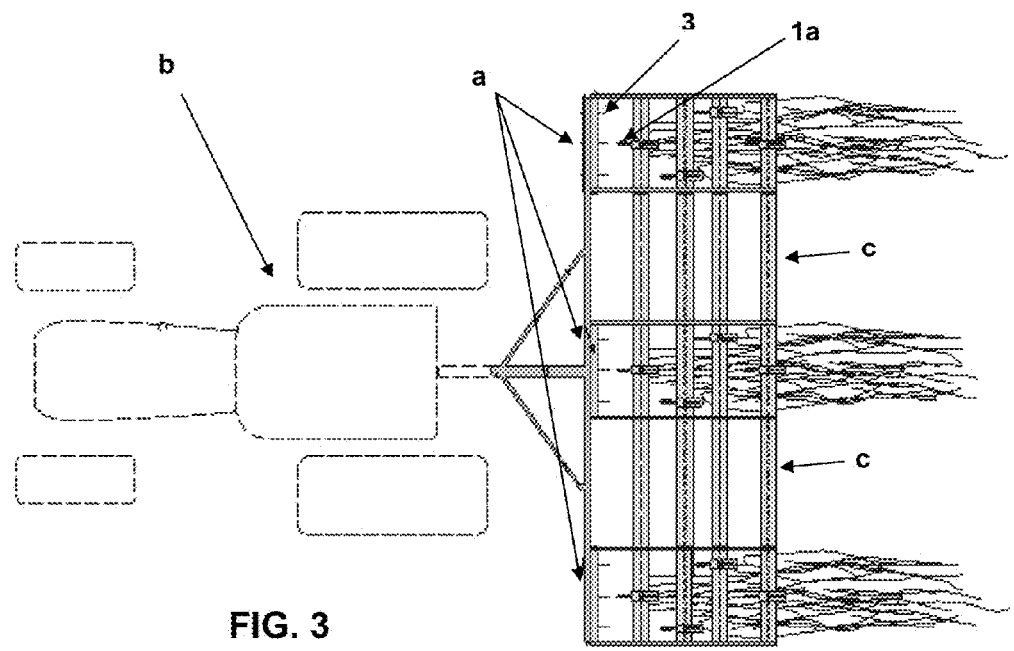
FIG. 3 shows the soil scarifier of the present invention pulled by a tractor through its drawbar, and wherein it is displayed the spacing "c" between the tillage units in order to achieve strip-scarifying.

In another preferred embodiment of the present invention illustrated in FIG. 3, all tillage units a are equally spaced apart on the width of the scarifier at a distance c.

Tillage units a are placed on a general support structure, and are able to move transversely to modify the spacing distance c between them.

Figure 4:
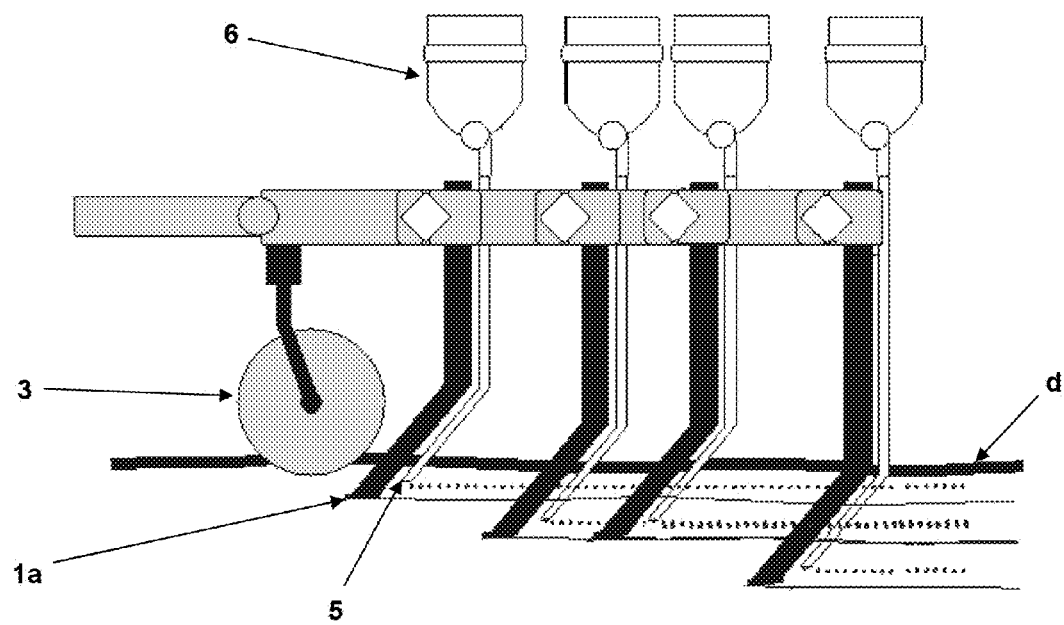
FIG. 4 is a side view of the tillage unit of FIG. 1, with a fertilization system applied on each tillage tine.

FIG. 4 shows a fertilization system incorporated to the tillage unit a, comprising a conduit 5 which receives fertilizer from a hopper 6.

The invention claimed is:

1. A scarifier having a front and a rear, wherein the scarifier is a deep strip tillage scarifier, comprising:
    a plurality of tillage units, spaced apart and located parallel to each other, where each tillage unit has only four tines, said four tines being connected to the scarifier via a support structure,
    and wherein said four tines consist of only a front tine, only a rear tine and only two intermediate tines,
    and wherein the two intermediate tines located between the front tine and the rear tine, have a lower end protruding deeper below the ground than a lower end of the front tine, and the rear tine has a lower end protruding deeper below the ground than the lower ends of the intermediate tines, and wherein the lower ends of the two intermediate tines are located at a same level relative to the ground,
    wherein the front tine and the rear tine are aligned in a centered position, whereby said front tine cuts a groove in a soil surface and is followed by the rear tine cutting in a same groove, and the two intermediate tines are located opposite to each other in a transversally off-centered position, whereby each of said two intermediate tines is arranged alone and cuts a respective groove, said two intermediate tines not being preceded or followed by any other tine when cutting the respective grooves.

2. The scarifier according to claim 1, wherein the plurality of tillage units are three tillage units which are equally spaced apart along the scarifier width.

3. The scarifier according to claim 1, wherein the tillage units are located on a general support structure, and are capable of moving transversally.

4. The scarifier according to claim 1, wherein each tillage unit incorporates front cutting organs of coulter or disk types.

5. The scarifier according to claim 1, wherein the tines can move transversally along said support structure.

* * * * *